United States Patent [19]
Madden, Jr.

[11] 3,923,292
[45] Dec. 2, 1975

[54] ENERGY ABSORBING DEVICES
[76] Inventor: Baxter C. Madden, Jr., 680 N. Loop Drive, Camarillo, Calif. 93010
[22] Filed: Oct. 15, 1974
[21] Appl. No.: 514,532

[52] U.S. Cl. ................................ 267/64 R; 267/34
[51] Int. Cl.² .................................... F16F 3/07
[58] Field of Search .......... 267/64 R, 65 R, 139, 34, 267/140, 181, 33

[56] References Cited
UNITED STATES PATENTS

| | | | |
|---|---|---|---|
| 2,701,714 | 2/1955 | Harwood, Jr. | 267/64 R |
| 2,724,588 | 11/1955 | Sheets | 267/35 |
| 2,888,258 | 5/1959 | Hoffstrom | 267/181 |
| 3,424,448 | 1/1969 | Chak Ma | 267/35 |
| 3,522,940 | 8/1970 | Nijhuis | 267/34 |

Primary Examiner—James B. Marbert
Attorney, Agent, or Firm—Richard S. Sciascia; Joseph M. St.Amand

[57] ABSTRACT

An energy absorbing device consisting of a hollow cylinder containing a plurality of hollow spheres and a plunger arrangement whereby said spheres absorb energy during plastic deformation thereof when forces are applied to said plunger. Such devices are applicable to automotive bumpers, aircraft landing gear, auto steering columns, elevator safety decelerators, etc.

14 Claims, 14 Drawing Figures

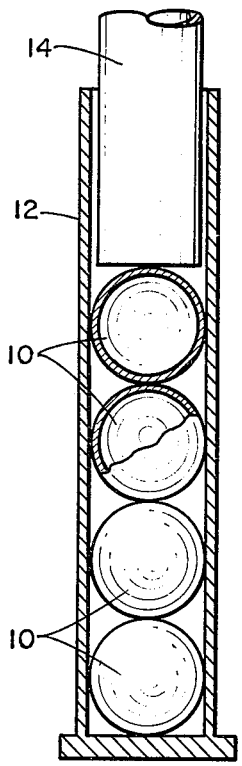

Fig. 1.

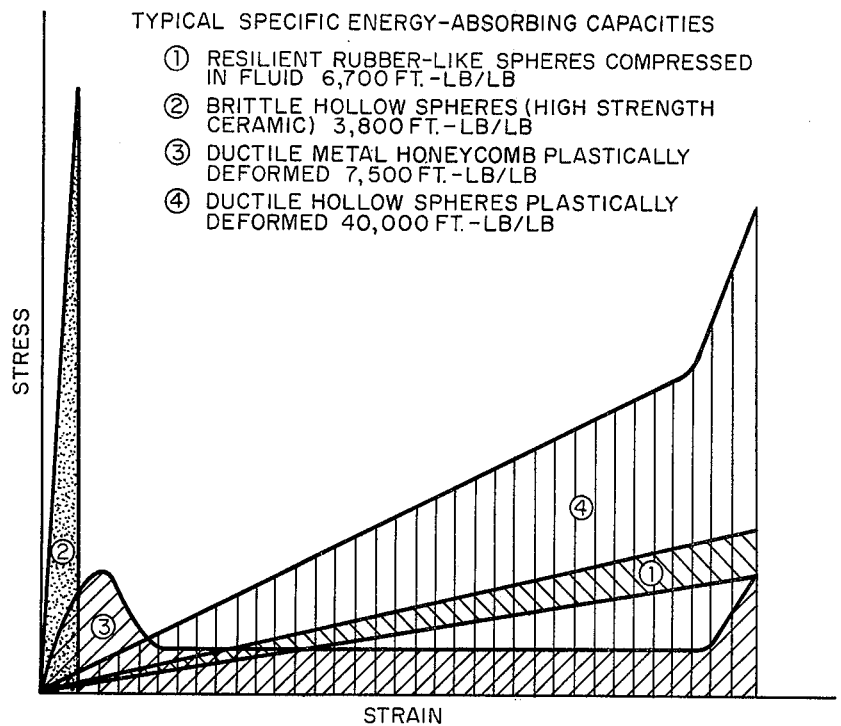

Fig. 3.

TYPICAL SPECIFIC ENERGY-ABSORBING CAPACITIES

① RESILIENT RUBBER-LIKE SPHERES COMPRESSED IN FLUID 6,700 FT.-LB/LB
② BRITTLE HOLLOW SPHERES (HIGH STRENGTH CERAMIC) 3,800 FT.-LB/LB
③ DUCTILE METAL HONEYCOMB PLASTICALLY DEFORMED 7,500 FT.-LB/LB
④ DUCTILE HOLLOW SPHERES PLASTICALLY DEFORMED 40,000 FT.-LB/LB

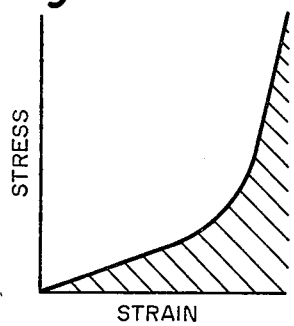

Fig. 2.

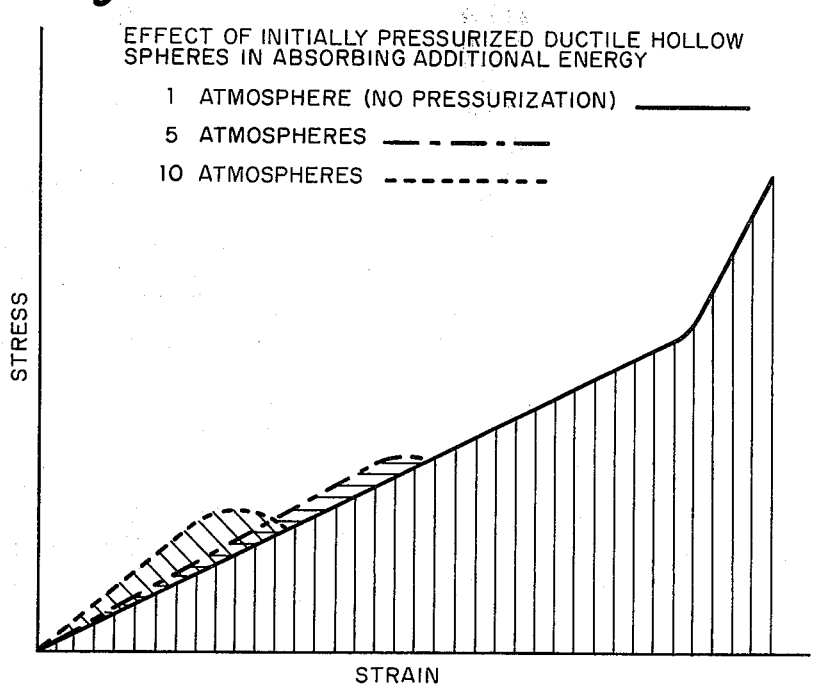

Fig. 4.

EFFECT OF INITIALLY PRESSURIZED DUCTILE HOLLOW SPHERES IN ABSORBING ADDITIONAL ENERGY

1 ATMOSPHERE (NO PRESSURIZATION) ———
5 ATMOSPHERES — — — —
10 ATMOSPHERES - - - - - -

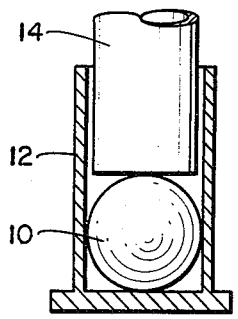

Fig. 5.

ENERGY ABSORBING DEVICES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to energy absorbing devices, and more particularly to a shock absorbing device having an easily replaceable deformable or crushable ductile unit wherein energy is absorbed at a gradual rate without rebound or quick collapse of the device.

A need exists for better energy absorbing devices to reduce damage to vehicles and injuries to persons therein when a vehicle is subjected to collision or to greater than normal deceleration. For example, such energy absorbing devices have applications in automobile bumpers and collapsible steering columns, at the bottom of elevator shafts, in aircraft landing gear for extremely hard landings, and in the landing gear of aircraft crew ejection capsules.

Prior energy absorbers which depend upon the deformation of spheres to absorb energy use: resilient rubber-like spheres, either hollow or solid, immersed in a liquid which transmits hydrostatic pressure to cause recoverable deformation of the spheres, or brittle glass-like hollow spheres which fracture when subjected to a predetermined stress. Another type of energy absorber uses ductile metal honeycomb which is crushed when stressed a predetermined amount. Resilient rubber-like spheres deform greatly but return most of the energy upon recovery. Brittle hollow spheres take high stresses with very little deformation before fracture, resulting in a steep spike of stress with a small area representing relatively little energy absorption. Ductile metal honeycomb has considerably less energy absorbing capacity because it deforms greatly under a moderate load. The present device using ductile hollow spheres, which deform greatly with a steep and continuously increasing load, provides an energy absorbing means which overcomes many of the disadvantages of prior art devices.

SUMMARY OF THE INVENTION

The present invention consists of a hollow cylinder coacting with a plunger arrangement. One or a plurality of hermetically sealed, substantially non-resilient, plastically deformable, ductile hollow spheres are placed within the cylinder to absorb energy applied thereto by the plunger as the spheres plastically deform. The spheres may be arranged within a canister or cemented together as a unit, which is easily replaced within the cylinder after use.

If is an object of the invention, therefore, to provide an energy-absorbing system embodying a relatively low cost, easily replaceable deformable unit for reducing damage to a vehicle or structure and injuries to personnel therein.

Another object is to provide an energy absorbing device using ductile hollow spheres which deform greatly with a steep and continuously increasing load and having greater energy-absorbing capacity than heretofore.

Still another object is to provide an energy absorbing device having a multiplicity of ductile hollow spheres therein geometrically arranged to produce a desired load deformation relationship.

A further object is to provide an energy absorbing device which permits increased load with very little increase in weight by the use of pressurized ductile hollow spheres.

Other objects, advantages and novel features of the invention will become apparent from the following detailed description of the invention when considered in conjunction with the accompanying drawings.

BRIEF DESCRIPTION OF THE DRAWINGS

FIG. 1 illustrates one embodiment of the invention using a single column of ductile hollow spheres as the replaceable energy absorbing medium.

FIG. 2 shows a typical stress-strain curve for the energy absorbing device of FIG. 1.

FIG. 3 are curves comparing the typical specific energy-absorbing capacity of various type spheres and honeycomb material with the spheres used in the present invention.

FIG. 4 are curves which illustrate the effect of initially pressurizing the hermetically sealed spheres to provide additional energy-absorbing capacity.

FIG. 5 shows an embodiment of the invention using only a single spherical unit.

DETAILED DESCRIPTION OF THE PREFERRED EMBODIMENT

Figure 6:
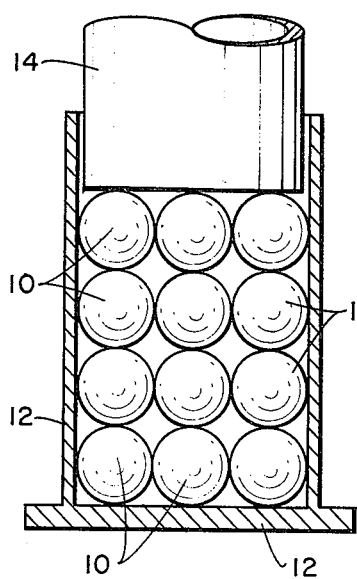
FIG. 6 illustrates an embodiment of the invention using multiple columns of spheres.

Investigation has shown that certain thin wall, hollow metal spheres when used as disclosed herein can provide a lightweight, low cost, replaceable energy absorbing medium. Tests of stacked, hermetically sealed, thin wall spheres 10 contained within a cylinder 12 and compressed by a plunger or piston 14, as in FIG. 1, shows a general load-deformation, i.e. stress-strain, relationship as shown in FIG. 2. The energy absorbed is represented by the area under the curve. With a replaceable energy absorbing unit weighing less than 0.025 pound, the energy absorbed is in excess of 200 foot-pounds. Spheres such as disclosed in U.S. Pat. No. 3,773,475 may be used for this purpose. Spheres as used in this invention have greater energy absorbing capability per unit weight than any other configuration.

Defining specific energy-absorbing capacity of a material as the amount of energy in foot-pounds that can be absorbed by one pound of that material, FIG. 3 shows a comparison of the hermetically sealed, ductile metal hollow spheres as used in this invention with various other type spheres and metal honeycomb of prior art devices. The resilient rubberlike spheres immersed in a substantially incompressible fluid, such as oil, deform greatly but return most of the energy upon recovery, as shown by curve (1) of FIG. 3. Brittle hollow spheres take high stresses with very little deformation before they fracture, resulting in a steep spike of stress with a small area representing relatively little energy absorption, see curve (2) of FIG. 3. Ductile metal honeycomb has considerably less energy absorbing capacity, curve (3) of FIG. 3, because it deforms greatly under a moderate load. However, the ductile hollow spheres as used herein deform greatly with a steep and continuously increasing load as shown by curve (4) in FIG. 3. It is apparent that on the basis of specific energyabsorbing capacity, the energy absorbing devices as disclosed herein using hermetically sealed, ductile hollow spheres absorb from 5 to 10 times the energy absorbed by prior type devices. The present energy absorbing device does not use spheres immersed in a liquid, such as oil, requiring a special sealed cylinder to prevent leakage, etc., and the spheres can be replaced easily and inexpensively. The diameter of piston or plunger 14 is normally slightly smaller than the inside diameter of cylinder housing 12 to allow air or other gases to escape from the interior of the cylinder as the plunger moves downward, deforming spheres 10; other suitable venting means can be used to accomplish this, as desired.

Additional energy-absorbing capacity with a small, but insignificant, increase in weight can be realized by initially pressurizing the hermetically sealed spheres with a gas. This effect is shown by the curves in FIG. 4. The curve differs from that for unpressurized spheres until the spheres rupture. When the ductile hollow spheres are pressurized with 5 or 10 atmospheres pressure, for example, there is a change, as shown in FIG. 4, in the initial load-deformation relationship of the energy absorbing device from that of the device using non-pressurized spheres, as was shown by curve (4) of FIG. 3. Pressurized spheres allow increased load to be handled with a relatively insignificant increase in weight. The present device also allows preloading of the energy absorbing unit so that any subsequent lesser load will not cause any significant deflection. Tests have shown that the present energy absorbing device absorbs energy without the undesirable rebound or collapse found in prior devices.

Tests have shown that thin wall, hollow metal spheres provide a lightweight, low cost, easily replaceable energy absorbing medium. For example, heat-treated hollow spheres, 1.0 inch in diameter, made from 0.010 inch thick PH15-7 Mo corrosion-resistant steel, initially pressurized with gas to 60 psig, were tested while constrained within a 1.19 inch diameter cylinder and slowly loaded with a 1.13 inch diameter plunger. A stack of three spheres which were compressed from an initial 3 inch height to 0.25 inch absorbed 230 ft. lbs. of energy and required a maximum load of 6,000 lbs. The weight of the replaceable energy absorbing unit (three 1 inch diameter spheres) was 0.024 lb. The deformation of the spheres was completely plastic; there was no measurable elastic deformation.

In some instances, a single, hermetically sealed, ductile hollow sphere 10 may be used in the energy absorbing device, as shown in FIG. 5. In such an instance, the single sphere may be pressurized, if desired, as in multiple sphere devices.

Figure 7:
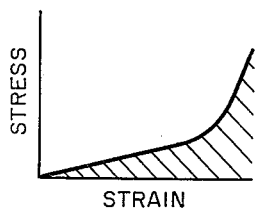
FIG. 7 shows a typical stress-strain curve for the device of FIG. 6.

Another embodiment of the energy absorbing device is shown in FIG. 6 with multiple columns of spheres 10 in cylinder 12 under the plunger 14. The number, diameter, wall thickness and material used for the hermetically sealed, ductile hollow spheres 10, as well as pressurization, can be varied to determine the energy absorbing capacity of the device. FIG. 7 shows the general configuration of a stress-strain curve for the device of FIG. 6.

Figure 8:
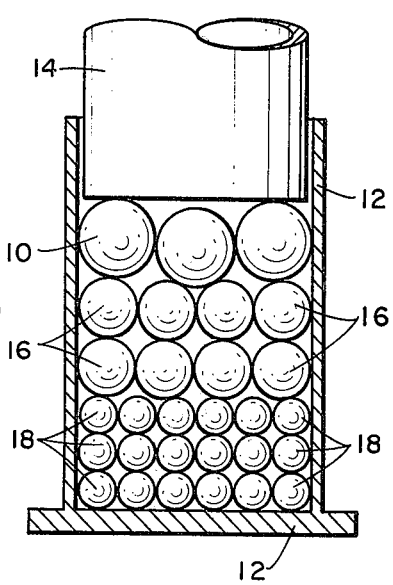
FIG. 8 illustrates an embodiment of the energy absorber of this invention using a plurality of spheres of various diameters.
Figure 9:
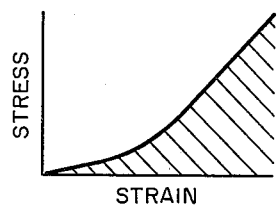
FIG. 9 shows a typical stress-strain curve for the device of FIG. 8.

In another embodiment of the energy absorber, as shown in FIG. 8, varying diameters of spheres are positioned under the plunger. Again, the number, diameters, wall thicknesses and materials, etc., used for the ductile hollow spheres will determine the energy absorbing capacity and the shape of the stress-strain curve shown in FIG. 9. Comparing FIGS. 7 and 9 shows how the energy absorbing capacity of the device can be varied by using a plurality of different sizes of spheres. Three sizes of spheres 10, 16 and 18 are shown in FIG. 8, by way of example. More or less sizes can be used and the spheres can also be pressurized, as previously discussed, if so desired.

Figure 10:
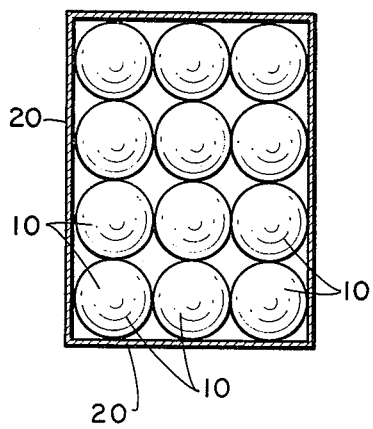
FIG. 10 shows a plurality of spheres assembled in a casing to form a cartridge or single unit.
Figure 11:
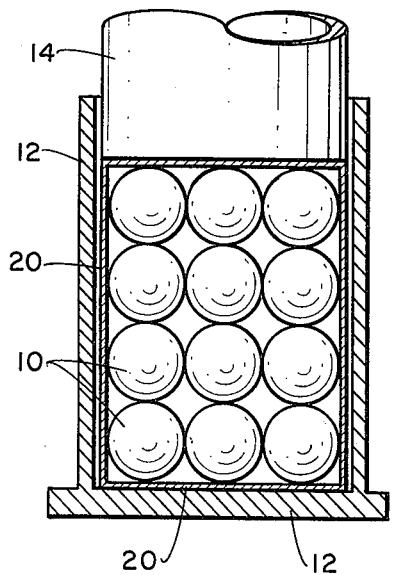
FIG. 11 shows a cartridge of spheres as in FIG. 10 positioned within the energy absorbing device.

For convenience in handling and replacing the spheres in cylinder 12 after use and deformation, a plurality of spheres 10 can be encased in a casing 20, as shown in FIG. 10, to form a single unit or cartridge. The cartridge can then be placed as a unit in cylinder 12, as shown in FIG. 11. Cartridge casing 20 can be made of any suitable material, such as paper, plastic, metal or metal foil, for example.

Figure 12:
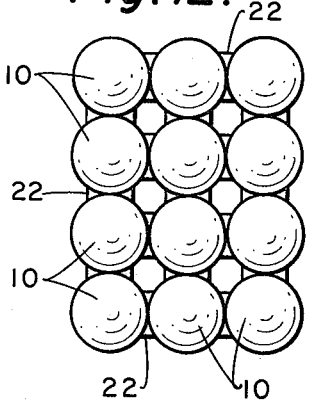
FIG. 12 is an assembly of spheres similar to that of FIG. 10 where the spheres are bonded together as a single unit without need for a casing.

If desired, a plurality of metal spheres 10 can be joined together at their contact points 22 by adhesive bonding, soldering, brazing or diffusion bonding to form a single unitary assembly, as shown in FIG. 12, which can be handled with ease and readily replaced in a cylinder 12 after use in the same manner as a cartridge shown in FIGS. 10 and 11.

Figure 13:
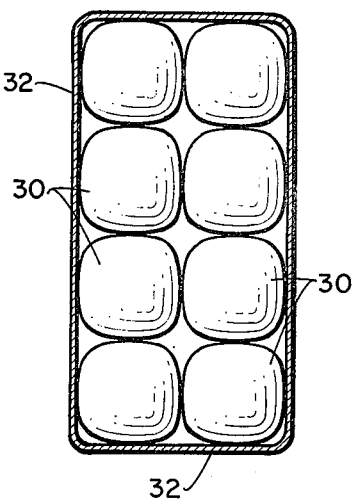
FIG. 13 illustrates a plurality of preloaded spheres, partially flattened against each other, and assembled together within a casing.
Figure 14:
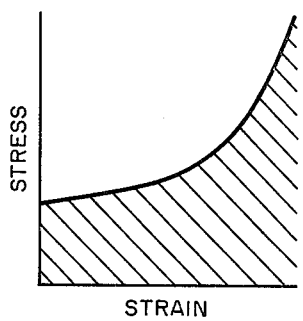
FIG. 14 is a typical curve for an energy absorbing device of this invention using an assembly of preloaded spheres as in FIG. 13.

Ductile hollow spheres can be partially flattened against each other into a slightly deformed shape 30 and encased in a cartridge casing 32, as shown in FIG. 13, or the partially deformed spheres 30 can be bonded together as are the spheres shown in FIG. 12, to form a single, replaceable unit consisting of a plurality of spheres. By partially deforming the spheres, as in FIG. 13, a higher initial load can be sustained by the energy absorbing device before further deformation will occur. By preloading the energy absorbing unit, a subsequent lesser load applied to the device will not cause any significant deflection. A stress-strain curve of an energy absorbing device, using partially prestressed or preloaded spheres 30, as in FIG. 13, will have substantially the general configuration shown in FIG. 14.

Use of an arrangement of ductile hollow spheres held together in a single unitary assembly, such as shown in FIGS. 10, 12 and 13, can be used as energy absorbers in some instances without the need for a plunger and cylinder arrangement. Also, the energy absorber assemblies can be used in a variety of applications other than those already enumerated above, such as for armor, safety walls and the like, where high energy absorption is needed as protection from high impacts and explosions.

Obviously many modifications and variations of the present invention are possible in light of the above teachings. It is therefore to be understood that within the scope of the appended claims the invention may be practiced otherwise than as specifically described.

I claim:

1. An energy absorbing device for controllably dissipating large amounts of impact load energy at a gradual rate without rebound or quick collapse of the device, comprising:
   a. a housing means having an open end and a closed end;
   b. a piston means slidably disposed in the open end of said housing means;
   c. at least one hollow body of substantially spherical configuration formed of ductile material arranged within said housing between said piston means and the closed end of said housing means;
   d. loading forces applied to said piston means being absorbed by non-recoverable plastic deformation of said at least one ductile hollow spherical body, said at least one spherical body operable to deform greatly as said piston means moves in the direction of the closed end of said housing means with a steep and continuously increasing load applied thereto;
   e. vent means allowing escape of any gases within said housing means as said piston means moves toward the closed end thereof; and
   f. the energy absorbing capacity of said device being varied by changing any of the diameter, number, wall thickness and material of the ductile hollow spheres.

2. An energy absorbing device as in claim 1 wherein said at least one ductile hollow spherical body is pressurized with a gas to increase the energy absorbing capacity thereof without any significant increase in weight.

3. An energy absorbing device as in claim 1 wherein a plurality of substantially spherical, ductile hollow bodies are arranged within said housing means.

4. An energy absorbing device as in claim 3 wherein said plurality of spherical bodies are bonded together into a unitary assembly for ease in replacement within said housing means.

5. An energy absorbing device as in claim 3 wherein said plurality of shperical bodies are arranged together within a thin casing to form a unitary assembly for ease in replacement within said housing means.

6. An energy absorbing device as in claim 3 wherein said plurality of spherical bodies are arranged in a single column.

7. An energy absorbing device as in claim 3 wherein said plurality of spherical bodies are arranged in a plurality of columns.

8. An energy absorbing device as in claim 3 wherein said plurality of spherical bodies vary in size.

9. An energy absorbing device as in claim 3 wherein said plurality of spherical bodies are arranged in layers, each layer consisting of a different size of sphere.

10. An energy absorbing device as in claim 3 wherein said plurality of spherical bodies are preloaded a determined amount such that a lesser load applied to said piston means will not cause any significant deflection.

11. A device as in claim 10 wherein said preloaded spherical bodies are bonded together into a unitary assembly for ease in replacement within said housing means.

12. A device as in claim 10 wherein said preloaded spherical bodies are arranged together within a casing to form a unitary assembly for ease in replacement within said housing means.

13. A device as in claim 1 wherein said housing and piston are cylindrical.

14. An energy absorbing device as in claim 1 wherein the said at least one hollow body is hermetically sealed.

* * * * *